(12) United States Patent
Syverson et al.

(10) Patent No.: US 8,333,056 B2
(45) Date of Patent: Dec. 18, 2012

(54) NON-BINDING CUTTERHEAD FOR CUTTING AQUATIC VEGETATION

(75) Inventors: Kurtis Michael Syverson, Oakdale, MN (US); Michael Todd Young, New Richmond, WI (US); Michael Joseph McCann, New Brighton, MN (US)

(73) Assignee: Liquid Waste Technology, LLC, New Richmond, WI (US)

( * ) Notice: Subject to any disclaimer, the term of this patent is extended or adjusted under 35 U.S.C. 154(b) by 57 days.

(21) Appl. No.: 12/915,995

(22) Filed: Oct. 29, 2010

(65) Prior Publication Data

US 2012/0102904 A1 May 3, 2012

(51) Int. Cl.
*A01D 44/00* (2006.01)
(52) U.S. Cl. .............................................................. 56/8
(58) Field of Classification Search .................... 56/8, 9, 56/328.1, 16.2, DIG. 2; 460/112, 111; 241/285.2, 241/605
See application file for complete search history.

(56) References Cited

U.S. PATENT DOCUMENTS

| | | |
|---|---|---|
| 1,028,671 A | 6/1912 | Brooks |
| 1,795,003 A | 3/1931 | Allen |
| 2,223,641 A | 12/1940 | Sanger |
| 2,486,275 A | 10/1949 | Grinwald |
| 2,635,406 A | 4/1953 | Chauvin |
| 2,702,975 A | 3/1955 | Friesen |
| 3,238,708 A | 3/1966 | Zickefoose |
| 3,407,577 A | 10/1968 | Fiske |
| 3,468,106 A | 9/1969 | Myers et al. |
| 3,653,192 A | 4/1972 | Bryant |
| 3,866,396 A | 2/1975 | Meyer |
| 3,971,148 A | 7/1976 | Deal |
| 4,070,978 A | 1/1978 | Virgilio |
| 4,095,545 A | 6/1978 | Vaughn et al. |
| 4,196,566 A | 4/1980 | Donnelley |
| 4,202,155 A | 5/1980 | Stewart |
| 4,205,507 A | 6/1980 | McClure |
| 4,248,033 A | 2/1981 | Bryant |
| 4,416,106 A | 11/1983 | Hawk |
| 4,583,353 A | 4/1986 | Shaver |
| 4,616,588 A | 10/1986 | Caddick |
| 4,638,621 A * | 1/1987 | Stewart et al. ....................... 56/9 |
| 4,815,260 A | 3/1989 | Desrosiers |
| 5,481,856 A | 1/1996 | Wickoren et al. |
| 5,482,508 A * | 1/1996 | Redekop et al. .............. 460/112 |
| 5,768,868 A * | 6/1998 | Stein .............................. 56/14.5 |
| 5,775,073 A * | 7/1998 | Kelpin et al. ........................ 56/8 |
| 5,782,660 A | 7/1998 | Brickell et al. |
| 6,511,374 B2 * | 1/2003 | VanEe ........................... 460/112 |
| 6,692,351 B2 * | 2/2004 | Johnson et al. ............... 460/112 |

(Continued)

*Primary Examiner* — Arpad Fabian-Kovacs
(74) *Attorney, Agent, or Firm* — Saul Ewing LLP

(57) ABSTRACT

A cutterhead for cutting aquatic vegetation, includes a cutterhead shroud, stationary teeth secured to the shroud, and a drum rotatably mounted within the shroud and bearing a flight of vanes cooperating with the teeth to cut vegetation. In accordance with the non-binding aspect of the cutterhead, each vane has an edge that rises gradually from a trailing end adjacent (during drum rotation) to a stationary tooth, to provide a clearance area adjacent the vane into which a respective tooth may be deflected during cutting without impinging upon an associated vane, and thus without causing binding of the cutterhead in the event of such deflection. Each vane may have a curvilinear edge extending from its cutting end to a surface of the drum at its trailing end. The edge defines a two-dimensional profile having a trailing end tangent forming an angle of not more than 70 degrees with the drum.

23 Claims, 7 Drawing Sheets

U.S. PATENT DOCUMENTS

| | | | |
|---|---|---|---|
| 7,297,053 B2 * | 11/2007 | Farley | 460/112 |
| 7,334,358 B1 | 2/2008 | Whyte | |
| 7,546,966 B2 * | 6/2009 | Lepage et al. | 241/285.2 |
| 7,555,889 B2 * | 7/2009 | Priesnitz et al. | 56/504 |
| 2002/0107056 A1 * | 8/2002 | VanEe | 460/112 |
| 2010/0093413 A1 * | 4/2010 | Pope et al. | 460/68 |

* cited by examiner

NON-BINDING CUTTERHEAD FOR CUTTING AQUATIC VEGETATION

FIELD OF INVENTION

The present invention relates generally to a cutterhead for cutting weeds and other aquatic vegetation in dredging applications, and more particularly to a cutterhead including a rotatable drum bearing helical flights of vanes that cooperate with stationary teeth to cut vegetation, in which the vanes are specially-configured to avoid binding of the rotatable drum.

BACKGROUND

During dredging operations, weeds or massed vegetation are often encountered that have grown in lagoons, in channels, or in other waters where removal is periodically required. Often the weeds or other aquatic vegetation represents an impediment to the removal of underlying sludge, sand, silt or other deposits.

Many different types of apparatuses have been used for cutting and removing aquatic vegetation. Exemplary devices of the prior art are shown in U.S. Pat. Nos. 669,820; 1,028, 671; 1,795,003; 2,223,641; 2,486,275; 2,635,406; 2,702,975; 3,238,708; 3,407,577; 3,468,106; 3,653,192; 4,070,978; 4,095,545; 4,196,566; 4,205,507; 4,416,106; 4,248,033; 4,616,588; and 4,815,260.

A device including an exemplary cutterhead is shown and described in U.S. Pat. No. 5,481,856, which is now commonly owned with the present application. The entire disclosure of U.S. Pat. No. 5,481,856 is hereby incorporated herein by reference. This exemplary cutterhead includes a rotatable drum bearing helical toothed cutting members that cooperate with stationary cutting teeth to tear/cut vegetation. This cutterhead is believed to be particularly effective in resisting wrapping of plant growth around the drum and its ends. However, as best shown in FIGS. 1-3, this prior art cutterhead has been found to damage to the teeth and binding of the drum.

Referring now to FIGS. 1-3, this exemplary prior art cutterhead 10 includes a rotatably mounted drum 12, a shroud 14, drum mounting structure 16 and motor 18. The cutterhead 10 is used in conjunction with a dredge 20 that includes engine compartment 22, pontoon hull 24, deck 25, cab 26, and a boom 28 pivotally mounted at the rear of the dredge. As shown in greater detail in FIG. 2, the boom 28 carries a pump 30 and pump motor 32 for operating the impeller located within the pump 30 and which receives material from the shroud 14 for delivery through the boom 28 to a remote location. The pump motor 32 and the motor 18 are both typically hydraulically driven by hydraulic fluid under pressure by power supplied by a hydraulic pump in the engine compartment 22 and delivered through hydraulic conduits 34 (to pump motor), 36 and 38 (to motor 18).

In greater detail, the drum 12 is substantially cylindrical and presents a smooth outer surface 40 with the exception of an array 42 of spirally oriented, convergent patterned, radially projecting drum teeth 44. The drum 12 may be made of mild steel which provides sufficient strength and durability.

As best shown in FIG. 3, the drum 12 includes a center section 46 and a pair of end sections 48 and 50, each including a pair of end halves. The center section includes an end wall 56 at each longitudinal end and a plurality of circumferentially spaced mounting flanges 56 which project longitudinally at each end and include nuts 60 welded thereto for receiving bolts which project through the surfaces of the end halves 52 and 54 and are threaded into the nuts. This enables easy removal of the end halves 52 and 54 for access to the drum mounting structure 16. As may be seen from FIG. 1, the array 42 extends through the end sections 48 and 50 whereby the spiral orientation of the array 42 is continuous from the ends of the drum 12 across the ends sections 48 and 50 and into the center section 46.

The array 42 includes two convergent helically oriented flights 41 and 43 of mounting plates 62 which are welded to the drum surface 40. The mounting plates 62 are spirally arrayed to provide a toothed cutting surface across virtually the entire width of the drum 12 when teeth 44 are mounted to the plates 62. Each tooth 44 is mounted by two bolts into nuts positioned on the opposite sides of the plates 62, so that every other tooth 44 spans two plates 62. Each tooth 44 presents leading cutting edge 64, a tip 66, and a trailing cutting edge 67, although the motor 18 is preferably a reversible hydraulic motor which permits clearing of the teeth by backwards rotation when necessary. During normal rotation of the teeth, the array 42 converges to an apex 69 to effectively auger the cut and dredged material toward the center of the drum 12.

The shroud 14 includes a pair of opposed end panels 68 and 70 for supporting drum mounting structure 16, upper and lower walls 72 and 74 respectively, angled walls 76 and 78 and back wall 80, all preferably of steel plate. The back wall 80 presents a facing 82 which extends normally above the upper wall 72. A port 84 is centrally located in the back wall and presents a plurality of surrounding holes to facilitate mounting to the pump 30.

Stationary cutterbars 86 and 88 are mounted to the upper and lower walls 72 and 74 respectively. Each cutter bar 86 and 88 presents a plurality of stationary cutterbar teeth 90 which are configured substantially the same as teeth 44 and mount to upstanding flanges 92 on each stationary cutterbar by bolts threaded onto nuts on the other side of the flanges. The spacing of the flanges 92 of each cutterbar 86 and 88, and therefore the teeth 90 carried thereby, is staggered whereby the teeth 90 on cutterbar 86 are not vertically aligned with the corresponding teeth 90 on cutterbar 88. However, the alignment of the teeth 90 corresponds to gaps 94 between the teeth 44 on the drum 12, whereby the slight transverse space between the teeth 44 receives the substantially fore and aft aligned teeth 90 of the stationary cutterbars with the distance between the drum teeth 44 and the cutterbar teeth 90 being about ½" at the closest point of approach to yield good cleaning and tearing action during rotation. In order to facilitate access to the teeth 90 for maintenance by providing adequate spacing therebetween, not every gap 94 receives a tooth 90 therebetween, but in the preferred embodiment shown, approximately two out of every three gaps 94 will receive a tooth 90 therebetween to provide a tearing relationship between the teeth 90 and the teeth 44 for cutting, writhing and rending any vegetation which wraps around the drum or drapes across the teeth 44 or teeth 90.

The drum mounting structure 16 is largely conventional and includes a hub that permits rotation between the shroud 14 and the drum 12. The hub is bolted to the end panel 70 and to the end wall 56 at one end of the center section of the drum 12. Another hub rigidly connects the motor 18 and the center section 46, and is bolted to the end wall 56 and the motor 18. In turn, the motor 18 is rigidly bolted to the end panel 68 and is preferably a reversible hydraulic motor which enables reversing of the drum 12 to clear any rocks, stumps or other large objects stuck between teeth 44 or teeth 90. The motor 18 is driven by hydraulic fluid supplied under pressure and delivered through conduits 36 and 38. The hubs are located in open-ended cavities and positioned outboard of end walls 56 and radially interior to end sections 48 and 50.

Another exemplary prior art cutterhead is somewhat similar but includes vanes instead of the toothed cutting members shown in FIGS. 1-3. Such vanes extend in helically-convergent flights on the rotatable drum, similar to the toothed cutting members, but are discontinuous along their lengths to define vanes separated by openings that provide clearance for the stationary cutterbar teeth 90 during rotation of the drum. Such vanes are believed to improve upon cutterheads including toothed cutting members in that they provide a double shearing action as vanes pass by on both sides of the stationary teeth.

FIGS. 4 and 5 show an exemplary prior art cutterhead that includes flights of dual-cutting mode vanes. These vanes are of two different types, both of which having leading and trailing edges that extend upwardly from a surface of the drum in a substantially perpendicular direction (substantially radially). A first type of the vanes 120 has a height, as measured from the surface 40 of the drum 12, that is substantially constant along the vane's length (e.g., approximately 3.5 inches above the surface of the drum). These vanes 120 have an outer edge 122 that cooperates with a cutting edge 87 of a shear bar 86 extending longitudinally along the drum, such that during rotation of the drum 12, vegetation is cut between the vane's outer edge 122 and the shear bar 86, thus providing a first mode of cutting action.

A second type of the vanes 130 has a height, as measured from the surface 40 of the drum 12, that varies along the vane's length (e.g., from approximately 3.5 inches above the surface of the drum to approximately 1 inch above the surface of the drum). These vanes 130 are interleaved between the constant height vanes 120, and pairs of the constant- and variable-high vanes cooperate with one another to bound each stationary tooth 90, such that during rotation of the drum 12, vegetation is cut between the stationary tooth 90 and the leading (and trailing) edges of the vanes 120, 130, thus providing a second mode of cutting action.

It is believed that such dual modes of cutting action enhance the cutterhead's cutting performance.

Cattails and plants with long stems and gnarled roots often grow in sediment lagoons and in channels, and when the sediment is to be removed during dredging, these plants are especially tenacious and tend to be difficult to cut. As a result, such vegetation has been known to cause binding (jamming) of the drum and thus the cutterhead. In such a case, the dredging operation is interrupted, and complete removal of the cutterhead and/or the dredging head is often required to remedy the problem, e.g., by replacing the cutterhead.

Therefore, an effective cutterhead is needed that is resistant to such jamming. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Generally, the present invention provides a cutterhead including stationary teeth mounted to a shroud, and a rotatable drum mounted within the shroud and having a flight of vanes, each of which has an edge that rises gradually from a trailing end to provide a clearance area adjacent the vane into which a respective stationary tooth may be deflected during cutting without impinging upon an associated vane.

Accordingly, a cutterhead for cutting aquatic vegetation, includes: a cutterhead shroud; a drum rotatably mounted within the shroud, the drum having a surface extending in a longitudinal direction; a first set of stationary teeth secured to the shroud, each of the teeth extending from the shroud toward the drum, each of the teeth having a cutting side and a trailing side opposite its cutting side.

In accordance with one aspect of the present invention, a cutterhead may further includes a flight of vanes secured to the drum in a helical array, each of the vanes having a cutting end and a trailing end, the vanes being grouped in adjacent pairs defining an opening therebetween for accepting a respective one of the first set of stationary teeth during rotation of the drum, each pair comprising: a first vane having a cutting end positioned to be longitudinally separated from the cutting side of a respective tooth by a narrow gap during rotation of the drum; and a second vane having a trailing end positioned to be longitudinally separated from the trailing side of the respective tooth by a similar gap; in which the trailing end of the second vane extends approximately 0 inches above the surface of the drum.

In accordance with another aspect of the present invention, a cutterhead may include a flight of vanes secured to the drum in a helical array, each of the vanes having a cutting end and a trailing end, each of the vanes further having a curvilinear edge extending from its cutting end to a surface of the drum at its trailing end.

In accordance with yet another aspect of the present invention, a cutterhead may include a flight of vanes secured to the drum in a helical array, each of the vanes having a curvilinear edge from a trailing end on the surface of the drum to a cutting end positioned to pass adjacent a respective one of said first set of stationary teeth during rotation of the drum, the edge having a tangent at the trailing end that forms an angle relative with the drum's surface of no more than approximately 70 degrees.

BRIEF SUMMARY OF DRAWINGS

The present invention will now be described by way of example with reference to the following drawings in which.

DETAILED DESCRIPTION

Figure 1:
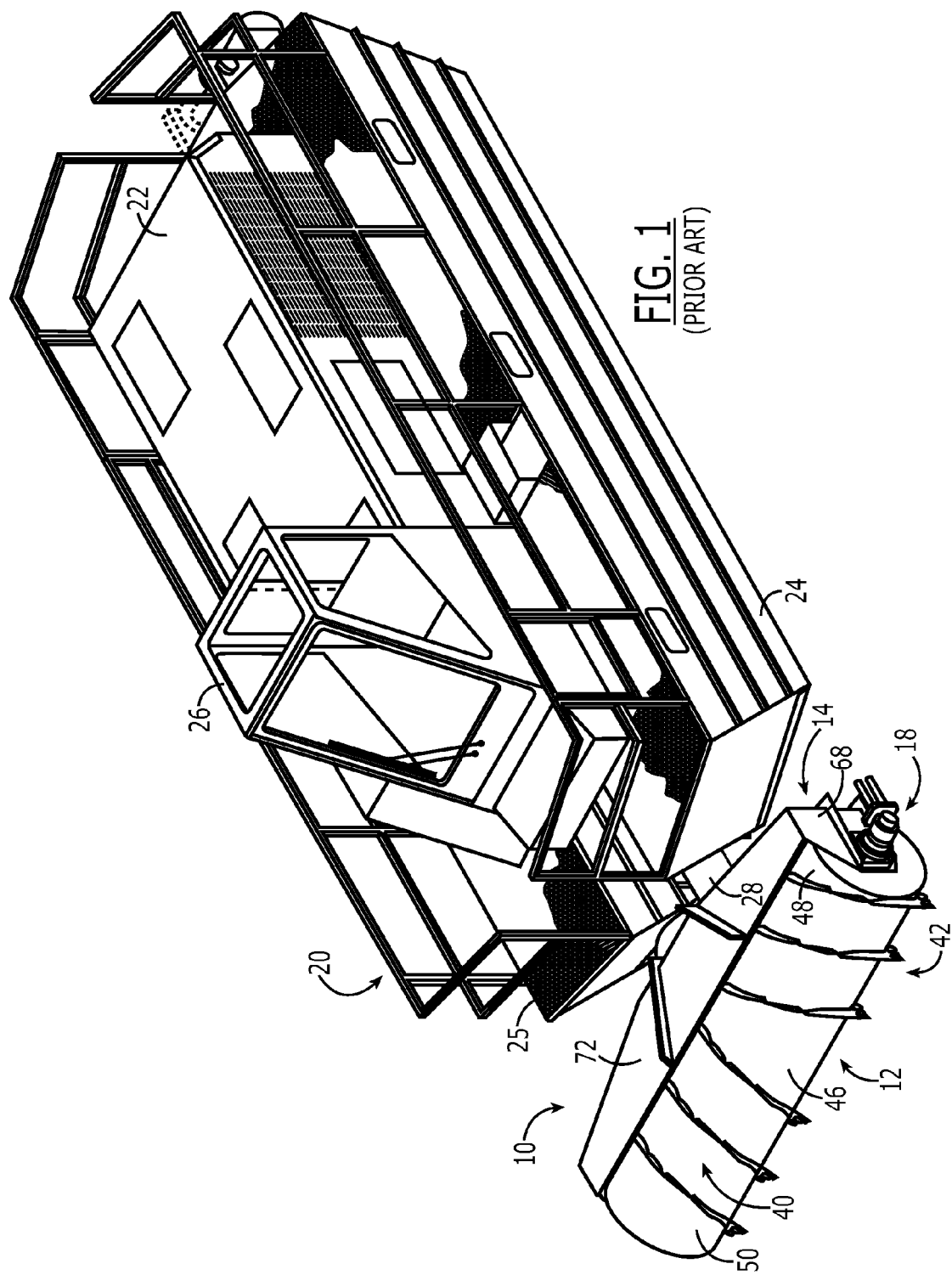
FIG. 1 is a perspective view of an exemplary prior art cutterhead mounted on a boom connected to a dredge.
Figure 2:
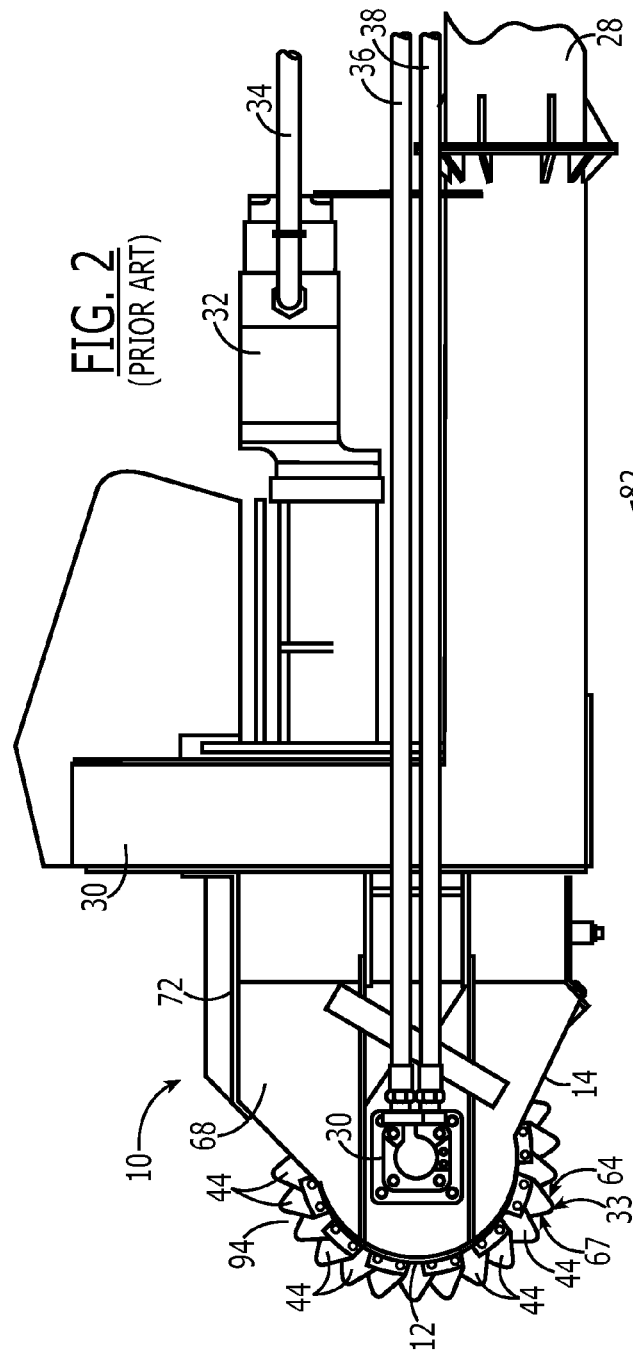
FIG. 2 is an enlarged fragmentary side elevational view showing the prior art cutterhead of FIG. 1 coupled to a pump and motor for passing cut vegetation through the boom.

We have determined that the binding of a cutterhead having flights of high-rise and/or low-rise vanes is due primarily to: (1) temporary deflection of a stationary tooth 90; and/or (2) permanent deformation of a stationary tooth 90. In either case, such deflection and deformation exceeds the close spacing tolerances (e.g., 0.125 inches as measured longitudinally along the surface 40 of the drum 12) between the vane 120, 130 and teeth 90 that are typically employed to facilitate vegetation cutting. Thus, such deflection and/or deformation often results in physical interference and impingement of the vanes 120, 130 and the stationary teeth 90, and causes resulting binding of the drum 12, and thus the cutterhead.

Accordingly, we have developed a cutterhead with specially-configured vanes 110 that provide tooth/vane clearance opposite a cutting side of the stationary tooth, to avoid physical interference of the tooth 90 and vane 110 in the event of deflection and/or deformation of the stationary tooth 90 during cutting. In comparison to prior cutterhead designs in which vanes cooperated to cut vegetation against both sides of a stationary tooth (a double-cutting-side design), the present invention (including a single-cutting-side design) improves cutterhead cutting performance unexpectedly by eliminating one of the two cutting sides.

In a preferred embodiment, each vane 110 is of a "tapered-rise" design. Such "tapered-rise" flights have a height, as measured from the surface 40 of the drum 12, that varies significantly along its length (e.g., from 0% of full height at a trailing end 112 immediately adjacent a stationary tooth 90 to 100% of full height at a cutting end 114 immediately adjacent an adjacent stationary tooth). More specifically, the cutterhead includes vanes having an outer edge that rises gradually from a trailing end to provide a clearance area adjacent the vane into which a respective stationary tooth may be deflected during cutting without impinging upon an associated vane. In comparison to prior cutterhead designs in which significant portions of high-rise vanes were positioned in close tolerances with an adjacent shear bar to improve cutting effectiveness, the present invention improves cutterhead cutting performance unexpectedly by reducing the portion of the flights that can be positioned in close tolerances with an adjacent shear bar.

Figure 4:
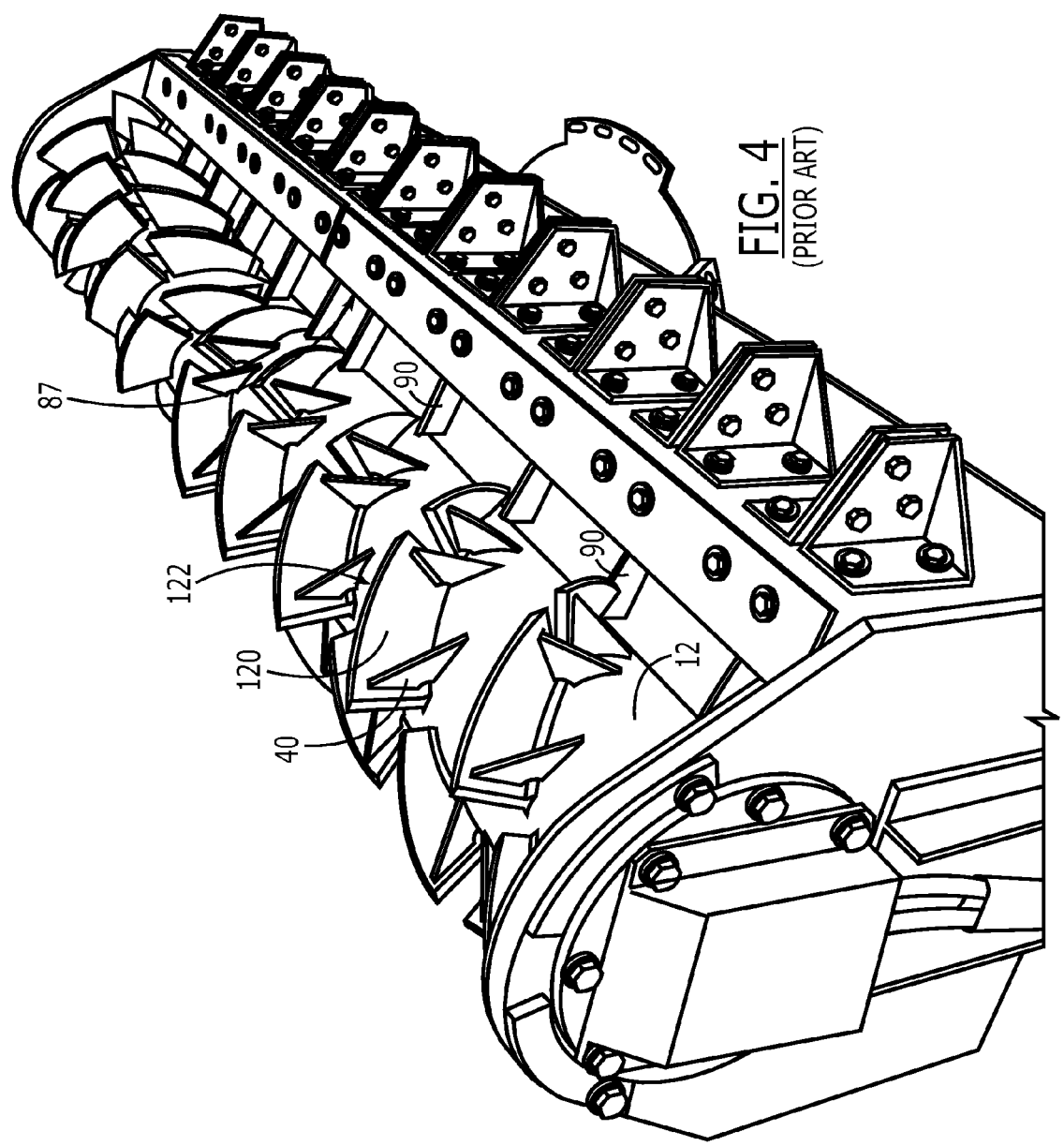
FIGS. 4 and 5 are perspective views of an alternative exemplary prior art cutterhead that includes dual-mode cutting vanes.
Figure 5:
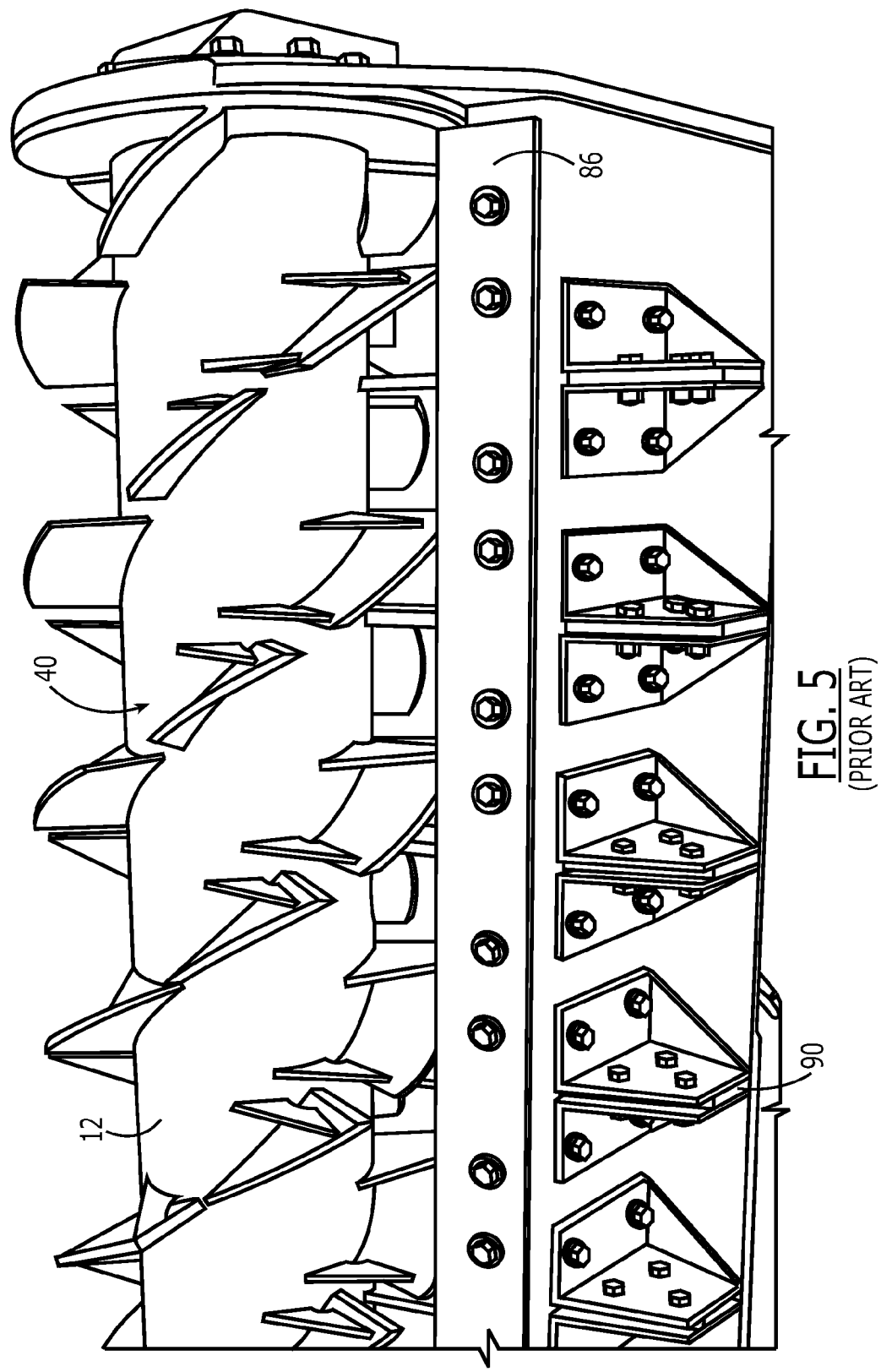
Figure 6:
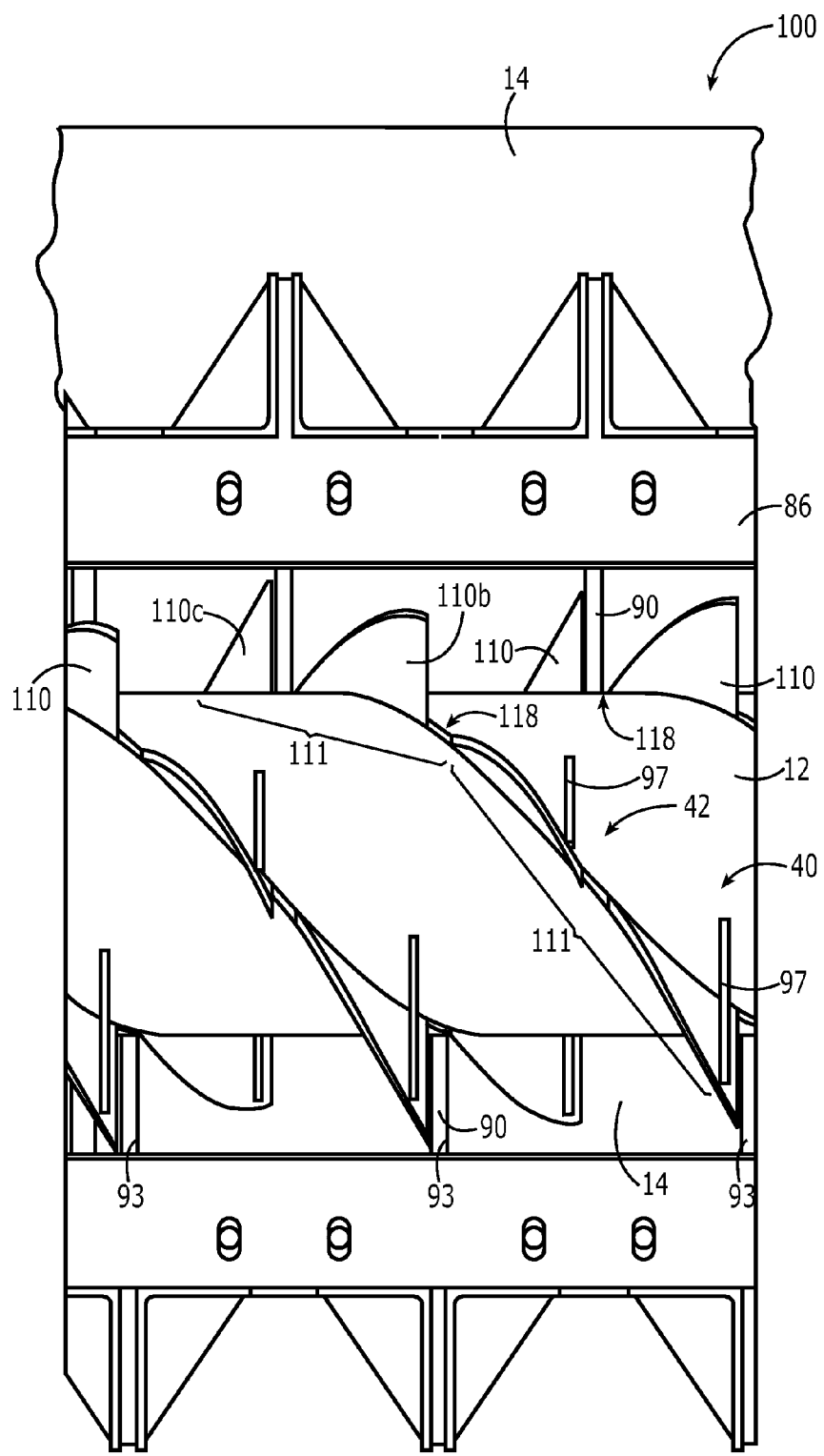
FIG. 6 is a partial top plan view of an exemplary cutterhead in accordance with the present invention.
Figure 7:
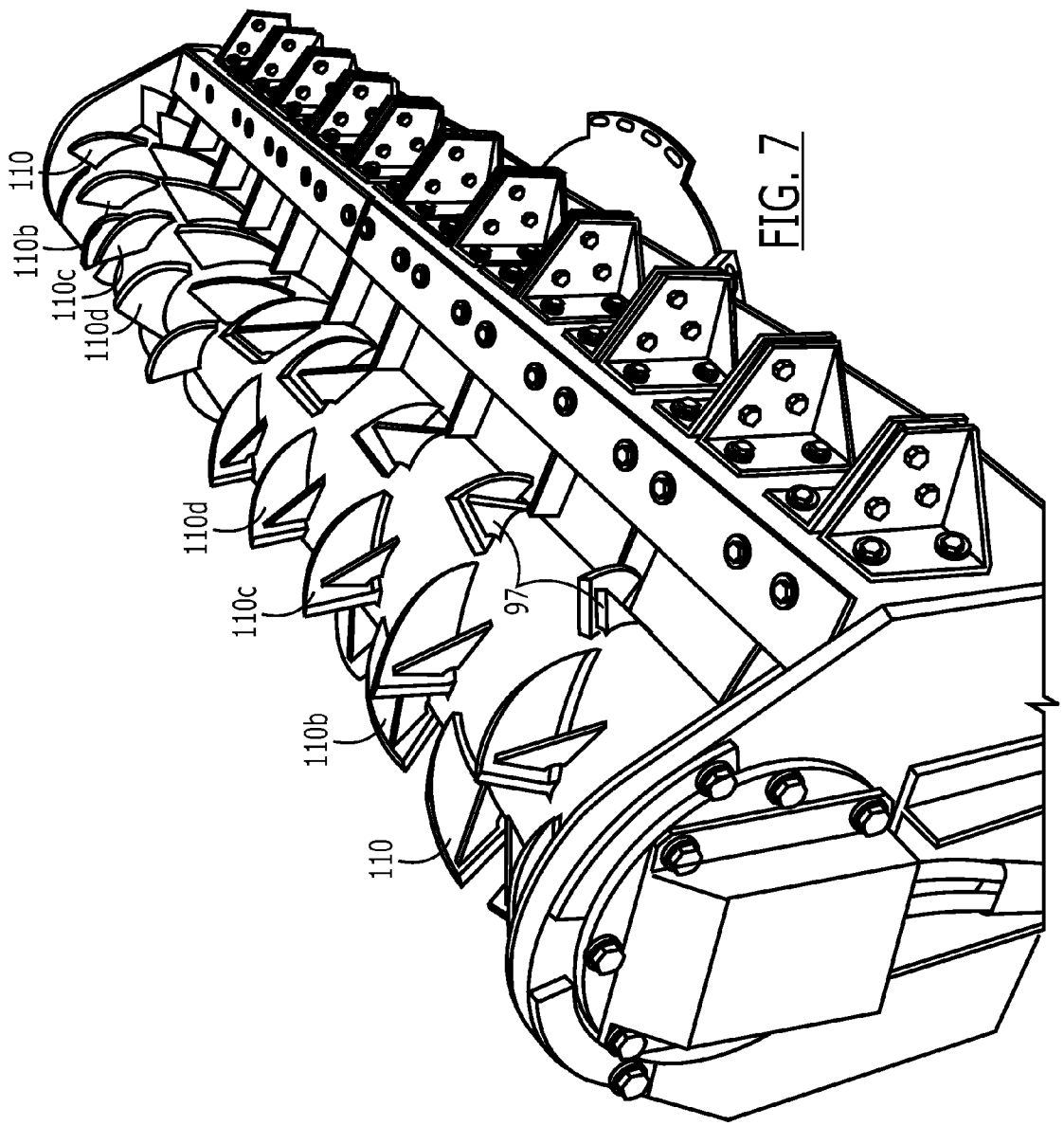
FIG. 7 is a perspective view of the exemplary cutterhead of FIG. 6.
Figure 8:
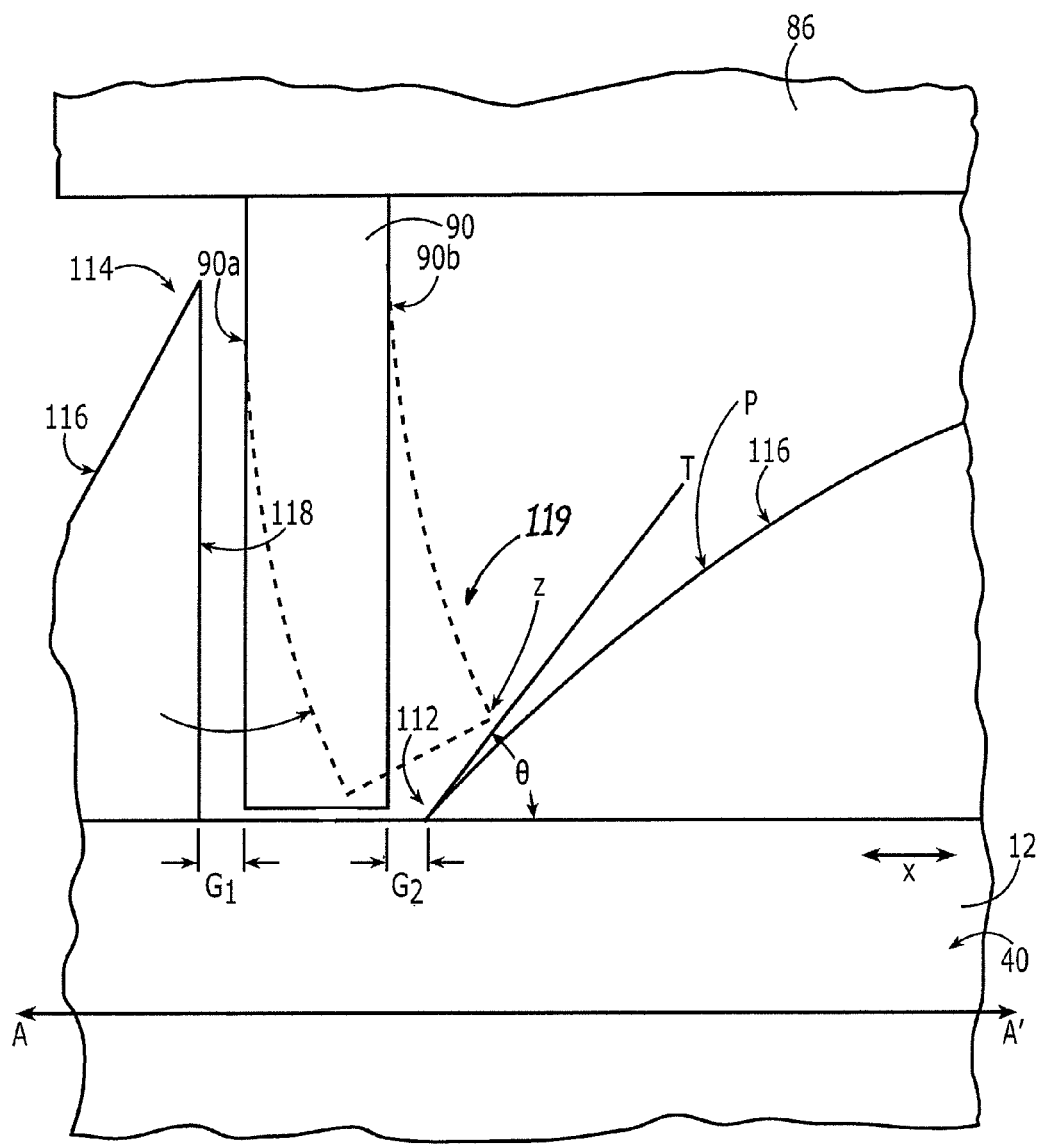
FIG. 8 is an exploded view of a portion of the cutterhead of FIG. 6.

Referring now to FIGS. 6-8, the present invention is discussed in greater detail below with reference to an exemplary inventive cutterhead 100 that is generally similar in overall structure to those shown in FIGS. 1-5, and particularly FIGS. 4 and 5. Further, the inventive cutterhead 100 may be employed in conjunction with a dredge 20 similar to that shown and discussed above with reference to FIGS. 1-3. Accordingly, the cutterhead 100 generally includes a rotatably mounted drum 12 and a shroud 14 and is coupled to a drum mounting structure and at least one motor.

Similar to those exemplary cutterheads discussed above, the exemplary cutterhead's 100 drum 12 is substantially cylindrical and presents a smooth outer surface 40 with the exception of an array 42 of helically-oriented, convergent-patterned, radially-projecting vanes 110. The drum 12 is preferably made of mild steel which provides sufficient strength and durability while the vanes 110 are hardened to cut aquatic vegetation encountered during dredging while at the same time withstanding impacts from rocks or other debris that may be encountered by the vanes while dredging.

The exemplary array 42 includes two convergent helically oriented flights 41 and 43 including vanes 110 that in this exemplary embodiment are welded to the drum surface 40. The vanes 110 are helically arrayed across virtually the entire width of the drum 12, as best shown in FIGS. 6 and 7. During normal rotation of the drum, the array 42 converges to an apex 69 to effectively auger the cut and dredged material toward the center of the drum 12.

The exemplary cutterhead 100 further includes first and second sets 91, 93 of stationary teeth 90 secured to the shroud 14, as best shown in FIG. 6. The teeth 90 of the second set 93 are interposed (in longitudinal position along the length of the drum) between the teeth 90 of the first set 91, as best shown in FIG. 6. In a preferred embodiment, the first and second sets 91, 93 of teeth 90 are disposed in separate rows extending parallel to a longitudinal axis AA' of the drum 12, the rows being separated by approximately 120 degrees about the longitudinal axis, as best shown in FIG. 6.

Each vane 110 has a cutting end 114, a trailing end 112, and an outer edge 116. The vanes 110 are grouped in adjacent pairs (e.g., pair 111 including vane 110a and 110b) defining an opening 119 therebetween for accepting one of the stationary teeth 90 during rotation of the drum 12. One of the vanes 110 of each pair has a cutting end 114 positioned to be longitudinally separated from a cutting side 90a of a tooth 90 by a narrow gap $G_1$, (e.g., 0.125 inches) during rotation of the drum, as best shown in FIG. 8. The other of the vanes 110 of each pair 111 has a trailing end 112 positioned to be longitudinally separated from the trailing side 90b of the tooth by a similar, e.g., identical gap $G_2$, e.g., 0.125 inches, as best shown in FIG. 8. Thus, each vane's cutting end 114 is positioned to pass by the cutting side 90a of a respective tooth 90 during rotation of the drum 12, and each vane's trailing end 112 is positioned to pass by the trailing side 90b of an adjacent tooth during rotation of the drum 12, as best shown in FIG. 8. In this exemplary embodiment, each vane 110 is provided with a gusset 97 adjacent each cutting end 114/cutting edge 118, as best shown in FIG. 6. Each gusset 97 extends circumferentially and is secured, e.g., welded, to the drum 12 and the vane 110 to brace and provide support for the vane during cutting of vegetation in cooperation with a stationary tooth 90.

In a certain embodiment, each vane's cutting end 114 includes a cutting edge 118 positioned to be separated from one of the teeth by a gap $G_1$, and the trailing end 112 of each vane is positioned to be separated from an adjacent one of the teeth by a distance no less than $G_1$, as best shown in FIG. 8, which shows two adjacent vanes, though virtually all vanes in this exemplary embodiment are similarly configured.

Consistent with the present invention, the vanes are specially-configured to avoid binding of the rotatable drum. More specifically, the outer edge 116 of each vane rises gradually from the trailing end 112 to provide a clearance region (denoted generally by Z, FIG. 8) adjacent the vane 110 into which a respective stationary tooth 90 will likely be deflected during cutting without impinging upon an associated vane. This clearance region Z encompasses a region adjacent the trailing side 90b of a stationary tooth 90 in which the tooth 90 is likely to be deflected or be deformed during cutting of plant growth. Accordingly, the vane is configured so as not to extend into the clearance region Z, so that in the event of deflection or deformation of a stationary tooth 90 into the clearance region Z during operation of the cutterhead, the deflected/deformed tooth 90 will not impinge upon the adjacent vane 110, and thus the cutterhead will not jam or bind. Accordingly, as the drum 40 rotates, the leading edge 114 of one vane passes tooth edge 90a while an adjacent vane creates a generally triangular-shaped clearance region Z between its trailing edge 112, helical edge 116 and tooth edge 90b, which allows for approximately 0.25 inches of lateral tooth tip deflection.

Various vane shapes/configurations may provide such a clearance zone, and any suitable vane shape/configuration may be used consistent with the present invention. By way of example, each vane may have a straight edge (the collective edges of the vanes collectively extending helically) or a curvilinear edge (e.g., generally triangular or sail-shaped as in FIG. 6). In a preferred embodiment, each vane 110 has a curvilinear edge 116 extending along a helix curve, as shown in FIGS. 6-8. In this example, the curvilinear edge extends from a trailing end 112 on the surface 40 of the drum 12 to a cutting end 114 positioned to pass adjacent a respective one of the stationary teeth 90 during rotation of said drum. In one such embodiment, the drum has an outer diameter of 10.75 inches and the helix curve has a pitch of approximately 30 inches, i.e., the flight of vanes spans one complete revolution about the drum 12 in a linear distance of 30 inches along the direction of elongation (X) of the drum 12, and thus the base of the vanes have a tangent form an angle of approximately 48 degrees relative to horizontal plane, as shown in FIG. 6.

Further, in a preferred embodiment, the curvilinear edge 116 of each vane 110 is defined such that a two-dimensional profile (see P, FIG. 8) defined by rotation of the three-dimensional vane has a tangent T forming an angle with the surface of the drum of not more than 70 degrees. In certain embodiments, the angle is not more than 46 degrees, or not more than 30 degrees.

In certain embodiments, the trailing end 112 of each vane extends approximately 0.0 inches above the surface 40 of the drum 12, as shown in FIGS. 6 and 8. In certain such embodiments, each vane has a curvilinear edge extending from its cutting end 114 to a surface 40 of the drum 12 at its trailing end 112, as best shown in FIGS. 6 and 8. Such an arrangement provides a substantial amount of clearance in the clearance area Z, particularly when the spacing between the free end of the stationary tooth 90 and the surface 40 of the drum 12 is relatively small, e.g., 0.0625 inches. It should be noted, however, that similar clearance in the region Z may be provided by increasing the vane height at the trailing end 112 as the spacing between the free end of the stationary tooth 90 and the surface 40 of the drum 12 increases.

In a certain exemplary embodiment, each vane's cutting end 114 includes a cutting edge 118 positioned to be separated from one of the teeth 90 by a gap $G_1$, and wherein each vane's trailing end 112 has a height of approximately 0.0 inches above the surface 40 of the drum 12 at a distance no less than $G_1$ from the trailing side 90b of a stationary tooth 90, as best shown in FIG. 8.

In use of the cutterhead 100, the shroud 14 is bolted to a pump, the conduits are connected to a hydraulic pump in the engine housing, and a boom is lowered by an operator in the cab to begin dredging, in a manner similar to that shown and described in U.S. Pat. No. 5,481,856, which is incorporated herein by reference. Any aquatic vegetation encountered during dredging is severed and cut while the drum 12 rotates by the cutting/tearing action between the stationary teeth 90 and the vanes 110 as they pass thereby. Notably, vegetation caught between a tooth 90 and an adjacent vane 110/cutting edge 118 may cause deflection and/or deformation of the tooth 90 during cutting. However, as shown in dashed line in FIG. 8, a deflected and/or deformed tooth 90 will be displaced laterally into the clearance zone Z, but will not impinge upon or interfere with an adjacent vane 110, as best shown in FIG. 8. Thus, jamming and binding of the cutterhead in the event of such deflection/deformation is avoided.

The vanes 110 collectively present cutting edges 118 that are spaced transversely across the entire length of the drum 12, and thus any vegetation passing across the path of the drum 12 will be engaged by a vane 110. As noted, except for the vanes 110, the exemplary drum 12 presents a substantially smooth surface which inhibits the ability of any vegetation to cling to the drum and become draped across it, thereby accumulating and fouling the cutterhead 100.

Figure 3:
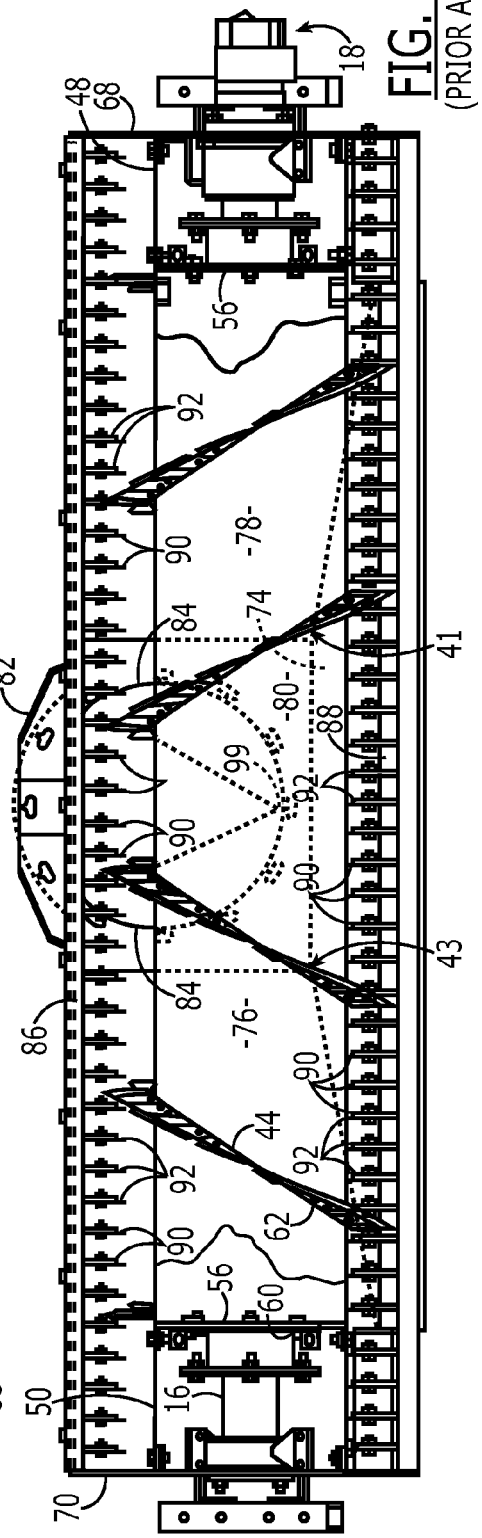
FIG. 3 is an enlarged top plan view of the exemplary prior art cutterhead, drum and shroud of FIG. 1, shown with a portion of the shroud broken away.

Each array 42, 43 of vanes 110 acts further as an auger to move any dredged sediment and cut vegetation to the center of the drum 12 and thus immediately proximate a port 84 for passage into the pump, as best shown in FIG. 3. The cutterhead 100 chops the vegetation into small enough pieces to avoid jamming the pump, and thus the cut vegetation and the sediment or other deposits can be effectively dredged. As in conventional dredging practice, the boom is raised or lowered by a winch mounted on the dredge to engage the vegetation and sediment or other deposits to the desired depth, and the dredge may be self-powered or positioned by shore-anchored cables to direct the cutterhead 100 laterally into position.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:
1. A cutterhead for cutting aquatic vegetation, the cutterhead comprising:
   a cutterhead shroud;
   a drum rotatably mounted within said shroud, said drum having a surface extending in a longitudinal direction;
   a first set of stationary teeth secured to said shroud, each of said teeth extending from said shroud toward said drum, each of said teeth having a cutting side and a trailing side opposite its cutting side; and
   a flight of vanes secured to said drum in a helical array, each of said vanes having a cutting end and a trailing end, said vanes being grouped in adjacent pairs defining an opening therebetween for accepting a respective one of said first set of stationary teeth during rotation of the drum, each pair comprising:
      a first vane having a cutting end positioned to be longitudinally separated from the cutting side of a respective tooth by a narrow gap during rotation of the drum; and
      a second vane having a trailing end positioned to be longitudinally separated from the trailing side of the respective tooth by a similar gap;
      the trailing end of said second vane extending approximately 0 inches above the surface of the drum.

2. The cutterhead of claim 1, wherein each vane has a curvilinear edge extending from its trailing end to its cutting end.

3. The cutterhead of claim 1, wherein said vanes are arranged about said drum along a helix curve having a pitch of approximately 30 inches.

4. The cutterhead of claim 2, wherein said drum is elongated along an axis, and wherein said curvilinear edge defines a two-dimensional profile having a tangent at said trailing end forming an angle with the surface of the drum of not more than 70 degrees.

5. The cutterhead of claim 1, wherein each vane's cutting end is positioned to pass by the cutting side of a respective tooth during rotation of the drum, and each vane's trailing end is positioned to pass by the trailing side of an adjacent tooth during rotation of the drum.

6. The cutterhead of claim 1, wherein said similar gap is identical to said narrow gap.

7. The cutterhead of claim 1, further comprising a second flight of vanes secured to said drum in a second helical array.

8. The cutterhead of claim 1, further comprising:
   a second set of stationary teeth secured to said shroud, said teeth of said second set being interposed between said teeth of said first set along a length of said drum, and separated from said first set angularly about an axis of the drum.

9. The cutterhead of claim 8, wherein said first and second sets of teeth are disposed in separate rows extending parallel to a longitudinal axis of said drum, said rows being separated by approximately 120 degrees about said longitudinal axis.

10. The cutterhead of claim 1, wherein said vanes are secured to said drum by welding.

11. The cutterhead of claim 1, wherein said drum is substantially cylindrical.

12. A cutterhead for cutting aquatic vegetation, the cutterhead comprising:
- a cutterhead shroud;
- a drum rotatably mounted within said shroud, said drum having a surface;
- a first set of stationary teeth secured to said shroud, each of said teeth extending from said shroud toward said drum;
- a flight of vanes secured to said drum in a helical array, each of said vanes having a cutting end and a trailing end, each of said vanes further being of a tapered rise design and having an edge rising gradually from a surface of the drum at its trailing end to its cutting end.

13. The cutterhead of claim 12, wherein each tooth has a cutting side and a trailing side opposite its cutting side, and wherein the cutting end of each vane is positioned to pass by the cutting side of a respective tooth during rotation of the drum, and the trailing end of each vane is positioned to pass by the trailing side of an adjacent tooth during rotation of the drum.

14. The cutterhead of claim 12, wherein each vane's cutting end includes a cutting edge positioned to be separated from one of the teeth by a gap G, and the trailing end of each vane is positioned to be separated from an adjacent one of the teeth by a distance no less than G.

15. The cutterhead of claim 12, wherein each vane's cutting end includes a cutting edge positioned to be separated from one of the teeth by a gap G, and wherein each vane's trailing end has a height of approximately 0 inches above the surface of said drum at a distance no less than G from the trailing side of a stationary tooth.

16. The cutterhead of claim 12, further comprising a second flight of vanes secured to said drum in a second helical array, the second helical array being helically convergent with said first helical array.

17. The cutterhead of claim 12, said edge is a curvilinear edge.

18. The cutterhead of claim 12, wherein said drum is elongated along an axis, and wherein said edge defines a two-dimensional profile having a tangent at said trailing end forming an angle with the surface of the drum of not more than 70 degrees.

19. The cutterhead of claim 18, wherein said angle is not more than 30 degrees.

20. The cutterhead of claim 12, wherein each edge rises gradually from said trailing end to provide a clearance area adjacent the vane into which a respective stationary tooth may be deflected during cutting without impinging upon an associated vane.

21. A cutterhead for cutting aquatic vegetation, the cutterhead comprising:
- a cutterhead shroud;
- a drum rotatably mounted within said shroud, said drum having a surface extending longitudinally relative to a central axis;
- a first set of stationary teeth secured to said shroud, each of said teeth extending from said shroud toward said drum; and
- a flight of vanes secured to said drum in a helical array, each of said vanes having a curvilinear edge extending from a trailing end on the surface of the drum to a cutting end positioned to pass adjacent a respective one of said first set of stationary teeth during rotation of said drum, said edge defining a two-dimensional profile having a tangent at said trailing end forming an angle with the surface of the drum of not more than 70 degrees.

22. The cutterhead of claim 21, wherein said angle is not more than 45 degrees.

23. The cutterhead of claim 21, wherein said angle is not more than 30 degrees.

* * * * *